United States Patent [19]
Shropshire

[11] Patent Number: 6,138,614
[45] Date of Patent: Oct. 31, 2000

[54] INLET TUBE FOR A WATER HEATER

[75] Inventor: Roger Dale Shropshire, Hartsville, S.C.

[73] Assignee: AOS Holding Company, Wilmington, Del.

[21] Appl. No.: 09/243,343

[22] Filed: Feb. 1, 1999

[51] Int. Cl.⁷ .................................................... F22B 5/04
[52] U.S. Cl. ...................... 122/13.3; 122/380; 126/362.1
[58] Field of Search ............................. 122/17, 380, 383, 122/392, 405, 407, 408.1; 126/361, 362.1

[56] References Cited

U.S. PATENT DOCUMENTS

| | | |
|---|---|---|
| 316,561 | 4/1885 | Moore . |
| 589,455 | 9/1897 | Winters . |
| 1,716,692 | 6/1929 | Gundlach . |
| 2,123,809 | 7/1938 | Seitz ........................................ 137/21 |
| 2,592,863 | 4/1952 | Conner ..................................... 122/13 |
| 3,251,346 | 5/1966 | Merino ..................................... 122/17 |
| 3,285,241 | 11/1966 | Bordeaux ............................... 126/362 |
| 3,447,560 | 6/1969 | Dodson et al. ......................... 137/337 |
| 3,465,123 | 9/1969 | Harris ..................................... 219/328 |
| 3,726,475 | 4/1973 | Eising ..................................... 236/102 |
| 3,762,395 | 10/1973 | Taylor ..................................... 126/261 |
| 3,776,456 | 12/1973 | Eising ..................................... 236/93 |
| 4,257,355 | 3/1981 | Cook ....................................... 122/17 |
| 4,414,464 | 11/1983 | Cloutier ................................. 219/312 |
| 4,505,231 | 3/1985 | Syler ...................................... 122/159 |
| 4,662,314 | 5/1987 | Moore, Jr. .............................. 122/379 |
| 4,714,053 | 12/1987 | Perry ...................................... 122/382 |
| 4,817,564 | 4/1989 | Akkala et al. ........................... 122/17 |
| 4,858,563 | 8/1989 | Perry ...................................... 122/382 |
| 4,898,150 | 2/1990 | Lewis ..................................... 126/361 |
| 4,911,108 | 3/1990 | Akkala et al. ........................... 122/17 |
| 4,951,614 | 8/1990 | Akkala et al. ........................... 122/17 |
| 4,964,394 | 10/1990 | Threatt ................................... 126/361 |
| 5,054,437 | 10/1991 | Kale ...................................... 122/13.1 |
| 5,341,770 | 8/1994 | Lannes ................................... 122/383 |
| 5,365,891 | 11/1994 | Hanning ................................. 122/382 |
| 5,741,458 | 4/1998 | Rowley ................................... 264/494 |

OTHER PUBLICATIONS

EverKleen Self–Cleaning Water Heaters brochure.

*Primary Examiner*—Denise L. Ferensic
*Assistant Examiner*—Gregory A. Wilson
*Attorney, Agent, or Firm*—Michael Best & Friedrich LLP

[57] ABSTRACT

An inlet tube or dip tube for use in a water heater includes a cylindrical tube having near its top end a plurality of outwardly-facing upper openings having a combined upper surface area. The tube also has near its bottom end a plurality of outwardly-facing lower openings having a combined lower surface area, and a downwardly-facing bottom opening defining a bottom surface area. The lower surface area is about fourteen times larger than the upper surface area, and about four times larger than the bottom surface area to provide an even distribution of water in the water heater tank.

17 Claims, 2 Drawing Sheets

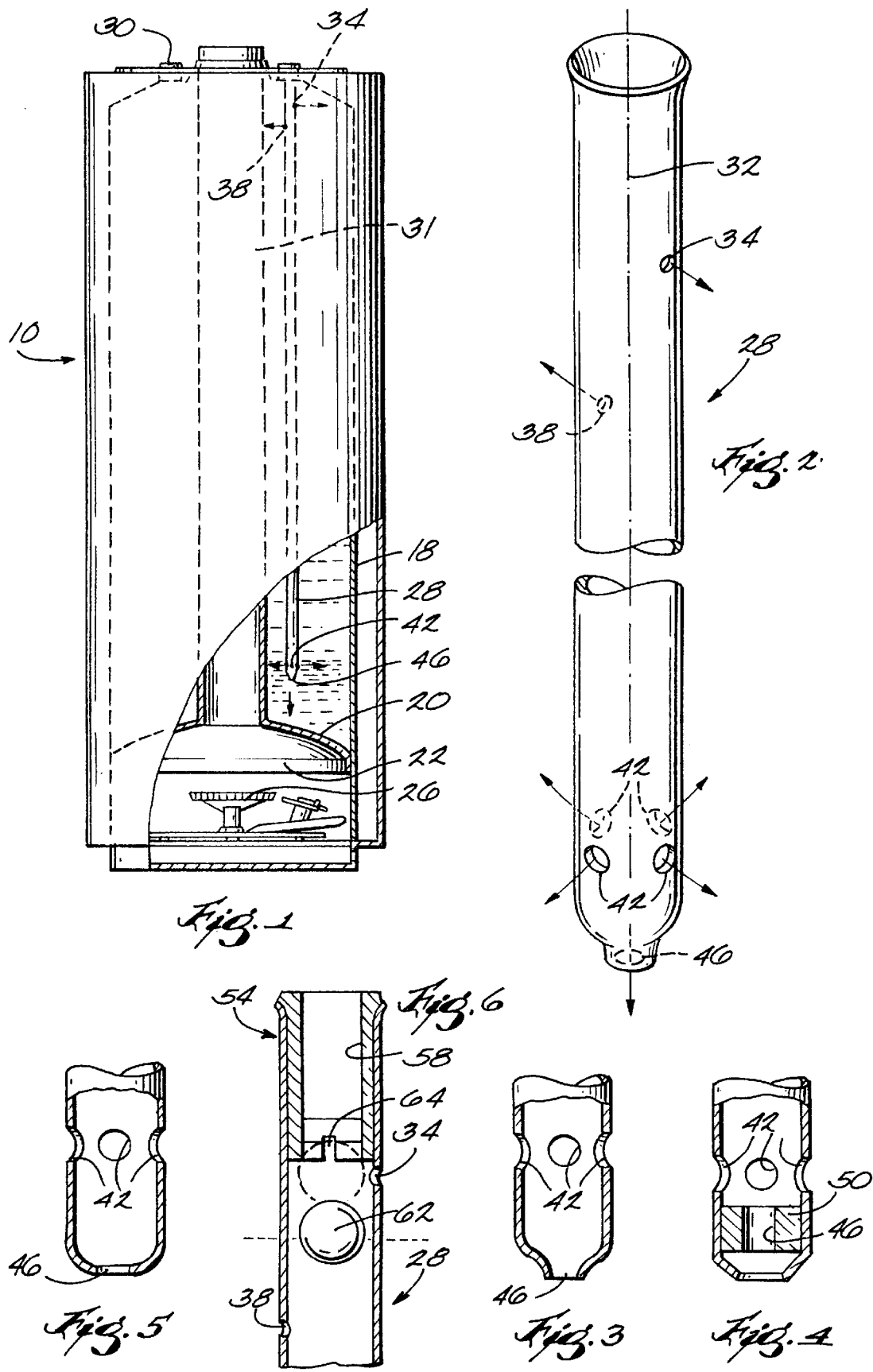

INLET TUBE FOR A WATER HEATER

FIELD OF THE INVENTION

The invention relates to inlet tubes for water heaters.

BACKGROUND

A goal in water heater design is to maximize the percentage of hot water stored in the water heater while maintaining the water temperature below a selected maximum temperature (e.g., scalding). The amount of hot water contained in a water heater is determined, in part, by the length of a cold water inlet tube, or dip tube, that extends into the water heater. A conventional inlet tube is a straight cylindrical tube having an opening at its bottom end. Due to thermal currents within the water heater, the water temperature is typically cool near the bottom of the water heater, and becomes hotter as it approaches the top of the water heater. The water at the top of the water heater is usually the hottest water in the water heater. This thermal phenomenon is commonly referred to as "stacking."

A longer conventional inlet tube will result in more hot water stored in the water heater, but may also result in the hottest water at the top of the water heater exceeding safe temperatures. The maximum length of a conventional inlet tube, and therefore the percentage of usable hot water in the water tank, is therefore limited by the selected maximum allowable water temperature.

It is known to provide transverse openings along the length of the inlet tube to improve mixing of cold water with hot water in the water heater. Such transverse openings have allowed some lengthening of the inlet tube, and consequent improvement in the percentage of usable hot water in a water heater.

SUMMARY

The invention provides an improved inlet tube for use in a water heater. The inlet tube has a longitudinal axis, a plurality of upper openings near the top end of the tube, and a plurality of lower openings and at least one bottom opening near the bottom end of the tube. The combined surface area of the upper openings equals an upper surface area, the combined surface area of the lower openings equals a lower surface area, and the bottom opening surface area defines a bottom surface area.

The upper, lower, and bottom surface areas are calibrated to provide a flow of cold water through the upper, lower, and bottom openings that maximizes the percentage of usable hot water in the water heater. Preferably, the lower surface area is about fourteen times larger than the upper surface area, and about four times larger than the bottom surface area.

The upper openings preferably include at least two openings facing inwardly toward an inner wall of the tube. The upper openings may be disposed at the same longitudinal level, or be longitudinally spaced from each other. Preferably, the upper openings include two openings facing outwardly 180° from each other, and longitudinally spaced from each other. At least one of the upper openings preferably serves as an anti-siphon hole.

The lower openings include at least two openings that are positioned at the same longitudinal level, or that are spaced longitudinally. Preferably, the lower openings include four openings of similar size disposed at the same longitudinal level and spaced around the inlet tube at regular intervals.

The bottom opening causes water flowing out of the tube to agitate sediment deposits at the bottom of the tank. One version of the bottom opening includes a nozzle extruded or otherwise formed at the bottom end of the tube. A second version of the bottom opening includes a plug positioned at the bottom end of the inlet tube and defining a bore for the passage of cold water out of the tube. A third version of the bottom opening is a hole punched, drilled, or otherwise formed in a closed end of the inlet tube.

The inlet tube may also include a heat trap. The heat trap preferably includes a ball that floats in water and that seats against a sleeve or stop near the top of the inlet tube when no water is flowing through the tube. When cold water is introduced through the tube, the ball is forced downwardly along the inside of the tube. Preferably, a second stop is disposed near the bottom of the tube to prevent the ball from blocking the bottom opening.

Other features and advantages of the invention will become apparent to those skilled in the art upon review of the following detailed description, claims, and drawings.

BRIEF DESCRIPTION OF THE DRAWINGS

FIG. 1 is a partially cut-away side elevational view of a water heater embodying the present invention.

FIG. 2 is a perspective view of the inlet tube.

FIG. 3 is a cross-section view of the bottom end of the inlet tube.

FIG. 4 is a cross-section view of an alternative construction of the bottom end of the inlet tube.

FIG. 5 is a cross-section view of another alternative construction of the bottom end of the inlet tube.

FIG. 6 is a cross-section view of the top end of the inlet tube including a heat trap.

Figure 8:
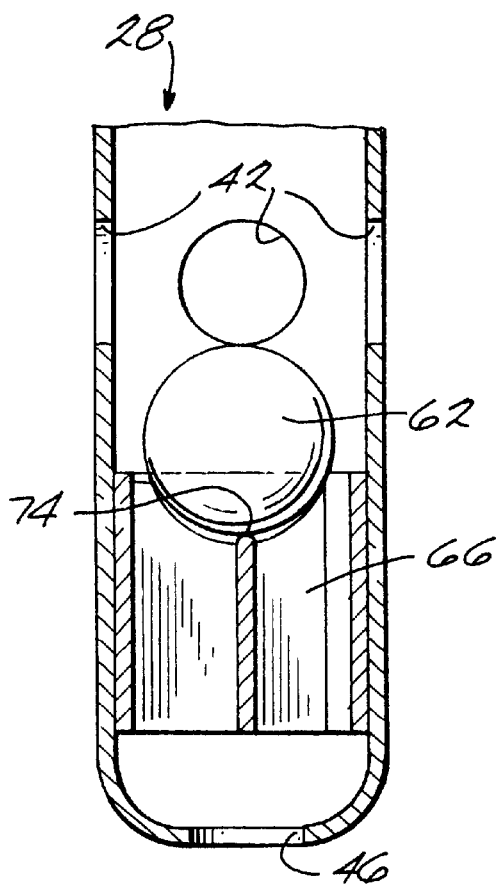
FIG. 8 is a cross-section view of the bottom end of the inlet tube including the heat trap lower stop.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

DETAILED DESCRIPTION

The water heater 10 illustrated in FIG. 1 includes a water storage tank 18 for holding a volume of water (e.g., thirty, forty, or fifty gallons). The tank 18 has a bottom wall 20, a combustion chamber 22 housing a burner 26, an inlet tube or dip tube 28 for introducing cold water into the tank 18, and a hot water supply tube 30 for removing hot water from the tank 18.

A flue 31 extends from the combustion chamber 22 through the tank 18 and to the top of the water heater 10. Products of combustion pass from the combustion chamber 22 to the atmosphere through the flue 31. The flue 31 transfers heat from the products of combustion to the water stored in the tank 18, thereby heating the water. The invention may also be embodied in an electric water heater, in which case an electrically heated element or elements extend into the tank 18 to heat the water. There is no flue 31, combustion chamber 22, or burner 26 in an electric water heater. As used herein, "heating device" includes both a gas burner and flue, and an electric heating element.

Referring to FIGS. 1 and 2, the inlet tube 28 is a cylindrical tube having a generally vertical longitudinal axis 32 and extending from the top of the water heater 10 into the storage tank 18. The tube 28 is made of polypropylene, polysulfone, or another high temperature material. Although the illustrated tube 28 is cylindrical, it may have any suitable cross-section. Preferably, the tube 28 has an outer diameter of about 0.75 inches, and an inner diameter of between 0.71 and 0.65 inches, depending on the thickness of the tube wall. The invention may be embodied in tubes having larger or smaller inner and outer diameters without changing the size and arrangement of openings described below.

The tube 28 has therein two upper openings 34, 38 near the top of the inlet tube 28. The upper openings 34, 38 face outwardly, are on opposite sides of the tube 28 (i.e., 180° apart), and are preferably vertically or longitudinally spaced from each other.

"Face outwardly" and "facing outwardly," as used herein to describe an opening, mean a direction generally away from the longitudinal axis 32. "Face inwardly" or "facing inwardly," as used herein to describe an opening, mean a direction generally toward the longitudinal axis 32. "Face downwardly" or "facing downwardly," as used herein to describe an opening, mean a direction generally parallel to the longitudinal axis 32 of the tube toward the bottom of the tank 18.

The upper openings 34, 38 are circular and each has an approximately 0.094 inch diameter. The illustrated upper openings 34, 38 are spaced approximately 1.75 inches and 3.25 inches, respectively, from the top of the inlet tube 28. Each of the upper openings 34, 38 has a surface area of approximately 0.0070 square inches, for a combined upper surface area of approximately 0.0140 square inches.

Because the upper openings 34, 38 are on opposite sides of the tube 28, the tube 28 is not "orientation prone" and can be installed without regard to the directions in which the upper openings 34, 38 face. Also, the upper opening 34 serves as an anti-siphon opening. Should the water heater 10 begin to drain out through the inlet tube 28, the flow of water out of the tank 18 will stop when the water level falls below the upper opening 34.

The inlet tube 28 also includes four lower openings 42 facing outwardly, and arranged at 90° increments. The lower openings 42 are circular and each has an approximately 0.25 inch diameter. The lower openings 42 are disposed at substantially the same vertical or longitudinal level. The lower openings 42 each have a surface area of approximately 0.0491 square inches, and have a combined lower surface area of approximately 0.1964 square inches. The lower surface area is thus about fourteen times larger than the upper surface area.

The distance between the upper openings 34, 38 and the lower openings 42 is determined, among other variables, by the height of the tank 18, the efficiency of the water heater's heating device, and the maximum allowable water temperature for a given application. It is appreciated that some adjustment to the distance between the upper apertures 34, 38 and the lower apertures 42 is required to properly install the inlet tube 28 in a particular environment. Such adjustment is well within the ability possessed by one of ordinary skill in the art and is therefore not further discussed herein.

The inlet tube 28 also includes at its bottom end a bottom opening 46 that opens downwardly. FIGS. 3–5 illustrate three versions of the bottom end of the tube 28. In each illustrated version, the bottom opening 46 is a circular, approximately 0.25 inch diameter opening. The bottom opening 46 has a bottom surface area of approximately 0.0491 square inches. Thus, the lower surface area is about four times larger than the bottom surface area.

FIGS. 1–3 illustrate the first version of the bottom end, in which the bottom end of the tube 28 is extruded to provide a nozzle including the bottom opening 46. FIG. 4 illustrates the second version of the bottom end of the tube 28 in which a plug 50 is inserted into the tube 28, and the bottom end is crimped to retain the plug 50 in the tube 28. The plug 50 has therethrough a bore that provides the bottom opening 46. Preferably, the plug 50 is made of polypropylene, polysulfone, or another high temperature material. FIG. 5 illustrates the third version of the bottom end of the tube 28 in which the bottom end is closed and the bottom opening 46 is punched, drilled, or otherwise formed in the closed bottom end.

Although the illustrated embodiment includes two upper openings 34, 38, four lower openings 42, and a single bottom opening 46, other arrangements of openings may be substituted for those shown, provided the upper, lower, and bottom surface areas are not substantially changed. For taller and shorter water heaters, the inlet tube 28 may be lengthened or shortened between the upper aperture 38 and the lower apertures 42 while maintaining the illustrated spacing between the upper apertures 34, 38 and the top of the tank 18. Also, the openings 34, 38, 42, 46 may take on any shape, such as an elongated slot or an irregular shape.

The upper openings 34, 38 may be arranged in any pattern, although preferably at least two openings are not directly opposite another upper opening (i.e., at least two upper openings face inwardly toward a tube wall, and not toward another upper opening). The lower openings 42 may be provided at varying angular and axial spacings with respect to each other, and are not limited to the pattern shown in the drawings (i.e., a lower opening may face inwardly toward another lower opening in the preferred embodiment). Preferably there are at least two lower openings 42 arranged so that the lower openings are not orientation prone. Also, more than one bottom opening 46 may be used.

In operation, as hot water is drawn out of the storage tank 18, cold water enters the storage tank 18 through the inlet tube 28. Water is forced out the lower openings 42, mixing with the heated water already present in the storage tank 18, water is also forced out the bottom opening 46, stirring up sediment deposits on the bottom wall 20 of the storage tank 18, and thereby helping to resist sediment buildup.

Thin streams of cold water are forced out the upper openings 34, 38 in response to pressure in the inlet tube 28. Arranging the upper openings such that at least two upper openings face inwardly toward a tube wall ensures that water will stream out of the upper openings when the appropriate pressure is attained in the tube 28. The cold water exiting through the upper openings 34, 38 mixes with the hottest water in the storage tank 18, thereby cooling the hottest water and maintaining it below a selected temperature.

Because of the preselected sizing and placement of the openings 34, 38, 42, 46 in the inlet tube 28, and the balanced upper, lower, and bottom surface areas, the inlet tube 28 may be made longer than conventional tubes while maintaining the hottest water at an acceptable temperature. As a result, there is more usable hot water in the storage tank 18 than possible in conventional water heaters.

Figure 7:
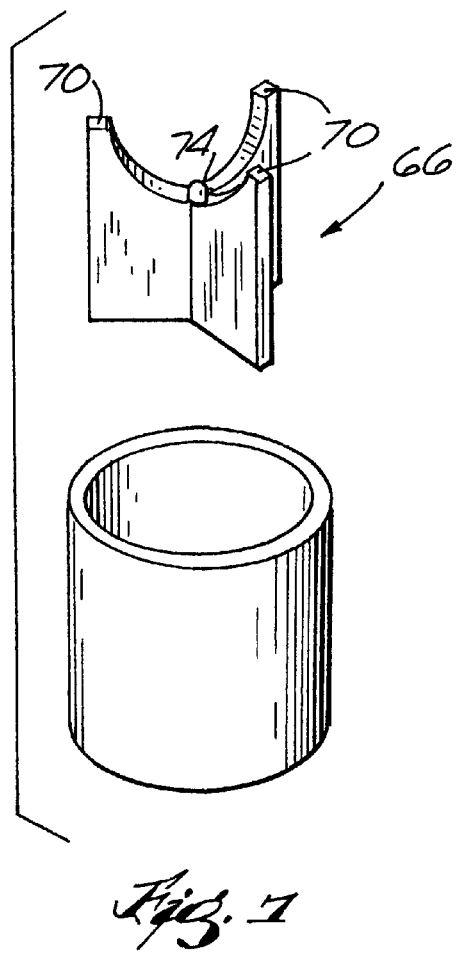
FIG. 7 is an exploded perspective view of the heat trap lower stop.

Referring now to FIGS. 6, 7, and 8, the inlet tube 28 preferably includes a heat trap 54. The heat trap 54 resists heat escaping through the inlet tube 28 when no cold water is flowing into the storage tank 18. The heat trap 54 includes an upper stop or sleeve 58 positioned within the upper portion of the inlet tube 28 above the upper openings 34, 38. The upper stop 58 is made of polypropylene, polysulfone, or another high temperature material. A sealing ball 62 floats on the water in the tube 28, and seats against the lower end of the upper stop 58 (as shown in phantom in FIG. 6) to substantially seal the inlet tube 28 when the storage tank 18 is full. Slots 64 in the lower end of the upper stop 58 allow small amounts of water to by-pass the ball 62. Although only one slot 64 is shown, three slots is preferred. When the water level in the storage tank 18 falls, the ball 62 drops below the upper stop 58 (as shown in solid lines in FIG. 6). The upper stop 58 and ball 62 also serve as a check valve to at least partially resist back-flow and siphoning of water out of the storage tank 18 through the inlet tube 28.

The heat trap 54 also includes (see FIGS. 7 and 8) a lower stop 66 disposed within the tube 28 near the bottom end. The lower stop 66 is inserted into the tube 28 and is held in place by the curving tube walls near the bottom of the tube 28. Alternatively, a ridge may be provided in the inlet tube 28 to hold the lower stop 66 at a selected vertical or longitudinal level. The lower stop 66 is preferably made of polypropylene, polysulfone, or another high temperature material.

The lower stop 66 includes a plurality of curved arms 70 joined at a central hub. The lower stop 66 includes a raised bump or nipple 74 on top of the hub. When cold water is introduced through the tube 28, the ball 62 is driven down to the bottom of the tube where it abuts the bump 74. Water flows around the ball 62, past the lower stop 66, and out the bottom opening 46. The lower stop 66 is positioned in the tube 28 such that the ball 62 does not block the lower openings 42.

The lower stop 66 may take on other shapes and sizes, provided it prevents the ball 62 from blocking the bottom opening 46. In the second version of the bottom end of the tube 28 (FIG. 4), the lower stop 66 may be modified to serve as the plug 50. In that case, the lower stop 66 would include a combination of apertures equalling the bottom surface area for the flow of water therethrough.

Various features of the invention are set forth in the following claims.

What is claimed is:

1. A water heater comprising:
    a water tank for containing water, said tank having a bottom wall;
    a heating device for heating water in said tank;
    a cold water inlet tube extending into said water tank along a longitudinal axis and having top and bottom ends, said tube having therein two upper openings adjacent said top end, said upper openings facing outwardly in opposite directions, and said upper openings being longitudinally spaced from each other, said inlet tube also having therein a plurality of lower openings adjacent said bottom end, said lower openings facing outwardly, said inlet tube also having a bottom opening at said bottom end, said bottom opening facing downwardly toward said bottom wall; and
    a hot water outlet communicating with said tank.

2. The water heater of claim 1, wherein one of said upper openings is located about 1.75 inches from said top end, and wherein the other of said upper openings is located about 3.25 inches from said top end.

3. The water heater of claim 1, wherein said lower openings are disposed at regularly-spaced increments around a circumference of said tube.

4. The water heater of claim 1, wherein said lower openings are all located at about the same longitudinal position.

5. The water heater of claim 1, wherein said lower openings include four openings.

6. The water heater of claim 1, further comprising a heat trap.

7. A water heater comprising:
    a water tank for containing water, said tank having a bottom wall;
    a heating device for heating water in said tank;
    a cold water inlet tube extending into said water tank along a longitudinal axis and having top and bottom ends, said tube having therein a plurality of upper openings having a combined upper surface area, said inlet tube also having therein a plurality of lower openings adjacent said bottom end, said lower openings having a combined lower surface area that is about fourteen times larger than said upper surface area, said inlet tube also having at least one bottom opening, said bottom opening being a nozzle facing downwardly toward said bottom wall and defining a bottom surface area, said lower surface area being about four times larger than said bottom surface area; and
    a hot water outlet communicating with said tank.

8. The water heater of claim 7, wherein said upper openings include at least two openings that face inwardly toward an inner wall of said inlet tube.

9. The water heater of claim 7, wherein two upper openings are angularly spaced apart from each other about 180°.

10. The water heater of claim 7, wherein one of said upper openings is located about 1.75 inches from said top end, and wherein the other of said upper openings is located about 3.25 inches from said top end.

11. The water heater of claim 7, wherein at least one upper opening is vertically spaced from another upper opening.

12. The water heater of claim 7, wherein said lower openings include four openings that are located at about the same longitudinal position.

13. A water heater comprising:
    a water tank for containing water, said tank having a bottom wall;
    a heating device for heating water in said tank;
    a cold water inlet tube extending into said water tank along a longitudinal axis and having top and bottom ends, said tube having therein a plurality of upper openings, at least two of said upper openings facing inwardly toward an inner wall of said inlet tube, one of said upper openings being located about 1.75 inches from said top end, and the other of said upper openings being located about 3.25 inches from said top end, said inlet tube also having therein a plurality of lower openings adjacent said bottom end, said inlet tube also having at least one bottom opening facing downwardly toward said bottom wall; and a hot water outlet communicating with said tank.

14. The water heater of claim 13, wherein two of said upper openings are angularly spaced apart from each other about 180°.

15. The water heater of claim 13, wherein at least one upper opening is vertically spaced from another upper opening.

16. The water heater of claim 13, wherein said lower openings are disposed at regularly-spaced intervals increments around a circumference of said tube.

17. The water heater of claim 13, wherein said lower openings are located at about the same longitudinal position.

* * * * *

UNITED STATES PATENT AND TRADEMARK OFFICE
CERTIFICATE OF CORRECTION

PATENT NO. : 6,138,614
DATED : October 31, 2000
INVENTOR(S) : Roger Dale Shropshire It is certified that error appears in the above-identified patent and that said Letters Patent is hereby corrected as shown below:

<u>Column 6, claim 1,</u>
Line 2, after the second occurrence of "opening" insert -- being a nozzle --.

Signed and Sealed this

Thirteenth Day of November, 2001

Attest:

*Nicholas P. Godici*

NICHOLAS P. GODICI
*Attesting Officer*        *Acting Director of the United States Patent and Trademark Office*